United States Patent
Sobh

(10) Patent No.: US 11,190,035 B2
(45) Date of Patent: Nov. 30, 2021

(54) DEVICE FOR CHARGING PORTABLE ELECTRONIC DEVICES

(71) Applicant: Adeeb Sobh, Dearborn, MI (US)

(72) Inventor: Adeeb Sobh, Dearborn, MI (US)

(*) Notice: Subject to any disclaimer, the term of this patent is extended or adjusted under 35 U.S.C. 154(b) by 0 days.

(21) Appl. No.: 16/443,804

(22) Filed: Jun. 17, 2019

(65) Prior Publication Data

US 2020/0203975 A1    Jun. 25, 2020

Related U.S. Application Data

(60) Provisional application No. 62/783,659, filed on Dec. 21, 2018.

(51) Int. Cl.

| | |
|---|---|
| *H02J 7/00* | (2006.01) |
| *H01R 13/72* | (2006.01) |
| *H02J 50/10* | (2016.01) |
| *H04B 1/3888* | (2015.01) |
| *H02J 7/02* | (2016.01) |

(Continued)

(52) U.S. Cl.
CPC .......... *H02J 7/0045* (2013.01); *H01R 13/72* (2013.01); *H01R 25/003* (2013.01); *H02J 7/00* (2013.01); *H02J 7/025* (2013.01); *H02J 50/10* (2016.02); *H04B 1/3883* (2013.01); *H04B 1/3888* (2013.01); *H04B 5/0037* (2013.01); *H04B 5/0075* (2013.01); *H04M 1/0262* (2013.01); *H04M 1/04* (2013.01); *Y02B 40/00* (2013.01)

(58) Field of Classification Search
CPC ........ H02J 7/0045; H02J 7/0052; H02J 7/025; H02J 50/10; H04B 1/3883; H04B 1/3888; H01R 25/003; H01R 13/72

USPC .......................................... 320/108; 307/104
See application file for complete search history.

(56) References Cited

U.S. PATENT DOCUMENTS

| | | | | |
|---|---|---|---|---|
| 5,923,147 A | * | 7/1999 | Martensson | ....... H01R 13/6675 320/111 |
| 6,416,355 B1 | * | 7/2002 | Liao | ................... H01R 13/6658 439/164 |

(Continued)

FOREIGN PATENT DOCUMENTS

| | | | | |
|---|---|---|---|---|
| GB | 2501354 A | * | 10/2013 | ............ H02J 7/0042 |

OTHER PUBLICATIONS

"Notebook Computer," McGraw-Hill Dictionary of Electrical and Computer Engineering, published 2004, ISBN 0-07-144210-3, p. 394.*

(Continued)

*Primary Examiner* — John T Trischler
(74) *Attorney, Agent, or Firm* — Dickinson Wright PLLC

(57) ABSTRACT

A device for charging a portable electronic device includes a housing having a first surface configured to adhere to the portable electronic device, and a cable having an end that is configured to connect to a power source. The cable may have another end that is connected to an inductive charging component and/or another connector of a cable that connects to a charging port of the portable electronic device. A battery of the portable electronic device is capable of being charged when either the connector of the cable is connected to the charging port of the portable electronic device or the other end of the cable is connected to the power source or via the inductive charging component. The housing defines a cavity configured to store the cable within the cavity when the cable is not in use.

27 Claims, 14 Drawing Sheets

(51) Int. Cl.
*H01R 25/00* (2006.01)
*H04B 1/3883* (2015.01)
*H04B 5/00* (2006.01)
*H04M 1/02* (2006.01)
*H04M 1/04* (2006.01)

(56) References Cited

U.S. PATENT DOCUMENTS

| | | | | |
|---|---|---|---|---|
| 6,459,175 B1 * | 10/2002 | Potega | | G01R 31/36 307/149 |
| 6,803,746 B2 * | 10/2004 | Aker | | H02J 7/0042 320/139 |
| 6,861,822 B2 * | 3/2005 | Wei | | H01R 13/60 320/111 |
| 6,926,130 B2 * | 8/2005 | Skowronski | | H02G 11/02 191/12.2 R |
| 6,960,727 B2 * | 11/2005 | Hering | | H01R 13/6633 174/135 |
| 6,994,592 B1 * | 2/2006 | Gannon | | H01R 31/065 320/111 |
| 7,002,265 B2 * | 2/2006 | Potega | | G01R 31/36 307/149 |
| 7,020,500 B2 * | 3/2006 | Saghbini | | H02J 7/0013 455/571 |
| 7,189,106 B2 * | 3/2007 | Young | | H01R 25/006 174/67 |
| 7,292,881 B2 * | 11/2007 | Seii | | H04B 1/38 455/575.1 |
| 7,393,242 B1 * | 7/2008 | Saje | | G06F 1/1628 439/501 |
| 7,399,198 B2 * | 7/2008 | Thalheimer | | H04R 5/02 439/501 |
| 7,554,828 B2 * | 6/2009 | Wilson | | G06F 1/263 363/146 |
| 7,679,902 B2 * | 3/2010 | Thompson | | G06F 1/1632 361/679.44 |
| 7,778,023 B1 * | 8/2010 | Mohoney | | G06F 1/1632 312/223.2 |
| 7,906,936 B2 * | 3/2011 | Azancot | | H02J 7/025 320/108 |
| 8,173,893 B2 * | 5/2012 | Huang | | G06F 1/1632 136/251 |
| 8,356,419 B2 * | 1/2013 | Lord | | G01B 3/11 33/756 |
| 8,690,600 B1 * | 4/2014 | Zeolla | | G06F 1/1628 439/131 |
| 8,744,098 B2 * | 6/2014 | Rothkopf | | H04R 1/1091 381/150 |
| 8,879,773 B2 * | 11/2014 | Merenda | | B65H 75/48 381/395 |
| 8,922,985 B2 * | 12/2014 | Richardson | | G06F 1/1626 361/679.3 |
| 9,125,462 B2 * | 9/2015 | Akin | | B23P 15/26 |
| 9,153,985 B1 * | 10/2015 | Gjovik | | H02J 7/0042 |
| 9,289,039 B2 * | 3/2016 | Akin | | B23P 15/26 |
| 9,312,707 B2 * | 4/2016 | Stewart | | H02J 7/0042 |
| 9,318,915 B2 * | 4/2016 | Miller | | H02J 50/00 |
| 9,385,549 B2 * | 7/2016 | Miller | | H02J 7/0042 |
| 9,392,349 B2 * | 7/2016 | Merenda | | H04R 1/1033 |
| 9,407,048 B2 * | 8/2016 | George | | H04B 1/40 |
| 9,457,674 B2 * | 10/2016 | Bianco | | B60L 11/1818 |
| 9,469,499 B1 * | 10/2016 | Chen | | B65H 75/4434 |
| 9,472,909 B2 * | 10/2016 | Ginsberg | | H01R 13/72 |
| 9,490,648 B2 * | 11/2016 | Sookprasong | | H02J 50/10 |
| 9,509,153 B2 * | 11/2016 | Clark | | H02J 7/0045 |
| 9,510,653 B2 * | 12/2016 | Akin | | B23P 15/26 |
| 9,559,472 B2 * | 1/2017 | Chien | | H02G 11/02 |
| 9,559,531 B2 * | 1/2017 | Gilbert | | H02J 7/0044 |
| 9,567,776 B2 * | 2/2017 | Moock | | E05B 73/0082 |
| 9,577,467 B1 * | 2/2017 | Karanikos | | H02J 7/0027 |
| 9,608,475 B1 * | 3/2017 | Karanikos | | H02J 7/025 |
| 9,654,606 B1 * | 5/2017 | Warren | | H02G 11/02 |
| 9,667,092 B2 * | 5/2017 | Miller | | H02J 7/0054 |
| 9,685,803 B2 * | 6/2017 | Strauser | | G06F 1/1632 |
| 9,762,013 B2 * | 9/2017 | George | | H04R 1/1033 |
| 9,781,985 B2 * | 10/2017 | Akin | | B23P 15/26 |
| 9,793,750 B2 * | 10/2017 | Miller | | H02J 7/0042 |
| 9,812,892 B2 * | 11/2017 | Miller | | H02J 7/0054 |
| 9,838,652 B2 * | 12/2017 | Chien | | H04N 7/181 |
| 9,845,912 B2 * | 12/2017 | Phillips | | G06F 21/84 |
| 9,902,276 B2 * | 2/2018 | Bianco | | B60L 11/1816 |
| 9,930,943 B2 * | 4/2018 | Lach | | H04M 1/04 |
| 9,992,887 B2 * | 6/2018 | Li | | H05K 5/0086 |
| 10,003,204 B2 * | 6/2018 | Clark | | H02J 7/0045 |
| 10,069,951 B2 * | 9/2018 | Enojado | | A45F 5/00 |
| 10,110,048 B2 * | 10/2018 | Loewen | | H02J 7/025 |
| 10,225,639 B2 * | 3/2019 | Merenda | | G06F 1/1626 |
| 10,237,990 B2 * | 3/2019 | Merenda | | H05K 5/0086 |
| 10,243,377 B2 * | 3/2019 | Clark | | H02J 7/0042 |
| 10,263,373 B2 * | 4/2019 | Byrne | | H02J 7/00 |
| 10,264,213 B1 * | 4/2019 | Sculley | | H04N 7/15 |
| 10,285,477 B2 * | 5/2019 | Akin | | B23P 15/26 |
| 10,326,921 B2 * | 6/2019 | Chien | | H04N 5/2256 |
| 10,349,758 B2 * | 7/2019 | Haroush | | A47F 7/022 |
| 10,419,054 B1 * | 9/2019 | VanTassell | | H04M 1/04 |
| 10,554,033 B2 * | 2/2020 | Girdzis | | H02J 7/00 |
| 10,555,597 B2 * | 2/2020 | Mody | | A44C 9/0061 |
| 10,581,480 B1 * | 3/2020 | Kim | | H04M 1/04 |
| 10,784,696 B1 * | 9/2020 | Pereira | | H02J 7/00 |
| 2003/0025476 A1 * | 2/2003 | Treia | | H02J 7/0003 320/107 |
| 2003/0089832 A1 * | 5/2003 | Gold | | G06F 1/1609 248/454 |
| 2003/0102845 A1 * | 6/2003 | Aker | | H02J 7/0042 320/139 |
| 2004/0090773 A1 * | 5/2004 | Bryan | | A45C 3/08 362/156 |
| 2004/0129522 A1 * | 7/2004 | Skowronski | | H02G 11/02 191/12.2 R |
| 2005/0042914 A1 * | 2/2005 | Hering | | H01R 13/6633 439/501 |
| 2005/0116684 A1 * | 6/2005 | Kim | | B60R 11/0241 320/114 |
| 2005/0117376 A1 * | 6/2005 | Wilson | | G06F 1/263 363/142 |
| 2005/0130712 A1 * | 6/2005 | Saghbini | | H02J 7/0013 455/572 |
| 2006/0011763 A1 * | 1/2006 | Kuo | | H02G 11/02 242/378.1 |
| 2006/0028169 A1 * | 2/2006 | Winn | | H02J 7/0044 320/107 |
| 2006/0052144 A1 * | 3/2006 | Seil | | H04B 1/38 455/575.1 |
| 2006/0126883 A1 * | 6/2006 | Thalheimer | | H04R 5/02 381/386 |
| 2006/0264094 A1 * | 11/2006 | Young | | H01R 25/006 439/501 |
| 2007/0216352 A1 * | 9/2007 | Shaddie | | H02J 7/0027 320/114 |
| 2008/0028118 A1 * | 1/2008 | Sayers | | G06F 1/1632 710/303 |
| 2009/0186264 A1 * | 7/2009 | Huang | | H01M 2/1022 429/96 |
| 2009/0298325 A1 * | 12/2009 | Jonker | | H01R 13/60 439/501 |
| 2010/0060081 A1 * | 3/2010 | Cheong | | H01R 13/6675 307/66 |
| 2010/0124040 A1 * | 5/2010 | Diebel | | G06F 1/1628 361/816 |
| 2010/0253282 A1 * | 10/2010 | Azancot | | H02J 7/025 320/108 |
| 2010/0275456 A1 * | 11/2010 | Lord | | G01B 3/11 33/706 |
| 2011/0074351 A1 * | 3/2011 | Bianco | | B60L 11/1816 320/109 |
| 2011/0148352 A1 * | 6/2011 | Wang | | B60R 11/0241 320/108 |
| 2011/0169451 A1 * | 7/2011 | Stampfli | | A45F 5/00 320/115 |

(56) References Cited

U.S. PATENT DOCUMENTS

| | | | |
|---|---|---|---|
| 2011/0188677 A1* | 8/2011 | Rothkopf | H04R 1/1033 381/150 |
| 2011/0192857 A1* | 8/2011 | Rothbaum | B25F 1/00 220/694 |
| 2011/0287726 A1* | 11/2011 | Huang | H04B 1/3883 455/90.3 |
| 2012/0037285 A1* | 2/2012 | Diebel | G06F 1/1628 150/165 |
| 2012/0181196 A1* | 7/2012 | Mongan | A45C 11/00 206/320 |
| 2013/0002049 A1* | 1/2013 | Stampfli | H01M 2/1022 307/150 |
| 2013/0165847 A1* | 6/2013 | Scarpaci | A61M 1/288 604/28 |
| 2013/0237290 A1* | 9/2013 | Simmons, Jr. | H04M 1/15 455/569.1 |
| 2013/0244475 A1* | 9/2013 | Sayadi | H01R 13/72 439/501 |
| 2013/0285601 A1* | 10/2013 | Sookprasong | H02J 50/10 320/108 |
| 2014/0020947 A1* | 1/2014 | Richardson | G06F 1/1626 174/520 |
| 2014/0103868 A1* | 4/2014 | Gilbert | H02J 7/0044 320/108 |
| 2014/0161301 A1* | 6/2014 | Merenda | B65H 75/48 381/384 |
| 2014/0232343 A1* | 8/2014 | Tadd | H02J 7/0042 320/114 |
| 2014/0320063 A1* | 10/2014 | Chien | H02G 11/02 320/107 |
| 2014/0333263 A1* | 11/2014 | Stewart | H02J 7/0042 320/111 |
| 2014/0335919 A1* | 11/2014 | Stewart | H02J 7/0042 455/573 |
| 2015/0015180 A1* | 1/2015 | Miller | H02J 50/00 320/103 |
| 2015/0035472 A1* | 2/2015 | Yang | H02J 7/025 320/103 |
| 2015/0156297 A1* | 6/2015 | Crawford | H04M 1/04 455/26.1 |
| 2015/0162760 A1* | 6/2015 | Clark | H02J 7/0045 320/103 |
| 2015/0216273 A1* | 8/2015 | Akin | B23P 15/26 135/16 |
| 2015/0216274 A1* | 8/2015 | Akin | B23P 15/26 135/16 |
| 2015/0364875 A1* | 12/2015 | Ginsberg | H01R 13/72 320/114 |
| 2015/0374083 A1* | 12/2015 | Akin | B23P 15/26 135/16 |
| 2016/0043514 A1* | 2/2016 | George | H01R 13/665 439/501 |
| 2016/0066453 A1* | 3/2016 | Quehl | G06F 1/166 206/45.2 |
| 2016/0066460 A1* | 3/2016 | Rayner | A45C 11/00 224/191 |
| 2016/0198818 A1* | 7/2016 | Akin | B23P 15/26 29/592.1 |
| 2016/0209885 A1* | 7/2016 | Ellis | G06F 1/189 |
| 2016/0226279 A1* | 8/2016 | Anderson | H02J 7/0045 |
| 2016/0233711 A1* | 8/2016 | Miller | H02J 7/0054 |
| 2016/0294209 A1* | 10/2016 | Miller | H02J 7/0054 |
| 2016/0294225 A1* | 10/2016 | Blum | H02J 5/005 |
| 2016/0301444 A1* | 10/2016 | George | H04B 1/40 |
| 2016/0329728 A1* | 11/2016 | Strauser | G06F 1/1632 |
| 2016/0380395 A1* | 12/2016 | Lee | H01R 13/72 307/104 |
| 2016/0380457 A1* | 12/2016 | Criss | H02J 7/0045 320/107 |
| 2017/0027079 A1* | 1/2017 | Dombrowski | H02J 5/00 |
| 2017/0063142 A1* | 3/2017 | Loewen | H02J 7/025 |
| 2017/0070076 A1* | 3/2017 | Karanikos | H02J 7/025 |
| 2017/0070077 A1* | 3/2017 | Karanikos | H02J 7/025 |
| 2017/0077724 A1* | 3/2017 | Clark | H02J 7/0045 |
| 2017/0104854 A1* | 4/2017 | Park | A45C 11/00 |
| 2017/0135234 A1* | 5/2017 | Kim | E05D 11/0054 |
| 2017/0142853 A1* | 5/2017 | Li | H05K 5/0086 |
| 2017/0215293 A1* | 7/2017 | Merenda | H04B 1/3888 |
| 2017/0244934 A1* | 8/2017 | Chien | H04N 7/181 |
| 2017/0256965 A1* | 9/2017 | Clark | H02J 7/0042 |
| 2017/0276289 A1* | 9/2017 | Phillips | G06F 21/84 |
| 2017/0302098 A1* | 10/2017 | Miller | H02J 7/025 |
| 2017/0321853 A1* | 11/2017 | Chien | H02J 7/0027 |
| 2017/0359452 A1* | 12/2017 | Enojado | H04M 1/15 |
| 2018/0027934 A1* | 2/2018 | Akin | B23P 15/26 |
| 2018/0031172 A1* | 2/2018 | van Bergen | G06F 21/84 |
| 2018/0032730 A1* | 2/2018 | Miller | G06F 21/565 |
| 2018/0069358 A1* | 3/2018 | Miller | H02J 7/0042 |
| 2018/0083465 A1* | 3/2018 | Miller | H02J 7/0045 |
| 2018/0087710 A1* | 3/2018 | Phillips | G06F 21/84 |
| 2018/0102654 A1* | 4/2018 | Miller | A45F 5/021 |
| 2018/0102655 A1* | 4/2018 | Miller | H05B 37/0281 |
| 2018/0138683 A1* | 5/2018 | Girdzis | H02G 11/02 |
| 2018/0191113 A1* | 7/2018 | Byrne | H02J 7/00 |
| 2018/0220782 A1* | 8/2018 | Mody | A45F 5/00 |
| 2018/0235361 A1* | 8/2018 | Ching | A47B 21/03 |
| 2018/0289189 A1* | 10/2018 | Lazzi | A47G 25/14 |
| 2018/0359346 A1* | 12/2018 | Chen | F16M 11/105 |
| 2018/0359873 A1* | 12/2018 | Shemirani | H01R 24/62 |
| 2018/0368776 A1* | 12/2018 | Kerem | G08B 21/0453 |
| 2019/0048667 A1* | 2/2019 | Krippner | H02G 11/02 |
| 2019/0089822 A1* | 3/2019 | Gartz | H04M 1/04 |
| 2019/0123577 A1* | 4/2019 | Loewen | H02J 7/025 |
| 2019/0133280 A1* | 5/2019 | Gordon | A45C 13/02 |
| 2019/0245360 A1* | 8/2019 | Clark | H02J 7/0027 |
| 2019/0253670 A1* | 8/2019 | Chien | H04N 7/181 |
| 2020/0085018 A1* | 3/2020 | Morin | A01K 11/008 |
| 2020/0163240 A1* | 5/2020 | Lee | F16M 11/10 |
| 2020/0259347 A1* | 8/2020 | Pereira | H02J 7/0042 |

OTHER PUBLICATIONS

"The 5 Best Cell Phone Stands," Kim Quindlen, Bustle, Published Online Apr. 20, 2018, Accessed Online May 11, 2020, https://www.bustle.com/p/the-5-best-cell-phone-stands-8843834 (Year: 2018).*

Technology Center 2800 STIC Search Report by Steve Chung at examiner's request, Published Feb. 2, 21.*

Inductive Charging; Wikipedia; Accessed Aug. 3, 2021; https://en.wikipedia.org/wiki/inductive_charging.

* cited by examiner

DEVICE FOR CHARGING PORTABLE ELECTRONIC DEVICES

CROSS-REFERENCE TO RELATED APPLICATION

This application claims priority to U.S. Provisional Patent Application No. 62/783,659, filed on Dec. 21, 2018, the contents of which is hereby incorporated by reference in its entirety.

BACKGROUND

1. Field of the Invention

The present invention generally relates to devices for charging electronics, especially portable electronics, such as mobile devices.

2. Description of Related Art

Portable electronic devices, such as mobile devices, generally contain a lithium-ion battery that is rechargeable. Depending on the operator's use of the portable electronic device, the battery of the portable electronic device may be able to provide power to power the device for a period of time ranging from six hours to more than a day. However, the reason for this large fluctuation between how long a portable electronic device can be powered by its battery is because the operators use of the portable electronic device, and also the physical characteristics of the portable electronic device, such as screen size, processing power, etc., can add numerous and significant variables regarding the length of time the battery can provide power to the portable electronic device.

Because the battery of the portable electronic device is rechargeable, one can simply connect the cable to a charging port of the portable electronic device into a power source, such as a USB port or a wall socket. However, most operators of portable electronic devices do not carry the appropriate cabling so as to allow for the charging of their portable electronic device because the cabling of the portable electronic device can be rather clumsy and bulky.

Further objects, features, and advantages of this invention will become readily apparent to persons skilled in the art after a review of the following description, with reference to the drawings and claims that are appended to and form a part of this specification.

SUMMARY

A device for charging a portable electronic device includes a housing having a first surface configured to adhere to the portable electronic device, and a cable having an end that is configured to connect to a power source. The cable may have another end that is connected to an inductive charging component and/or another connector of a cable that connects to a charging port of the portable electronic device. A battery of the portable electronic device is capable of being charged when either the connector of the cable is connected to the charging port of the portable electronic device or the other end of the cable is connected to the power source or via the inductive charging component. The housing defines a cavity configured to store the cable within the cavity when the cable is not in use.

DETAILED DESCRIPTION

Figure 1A:
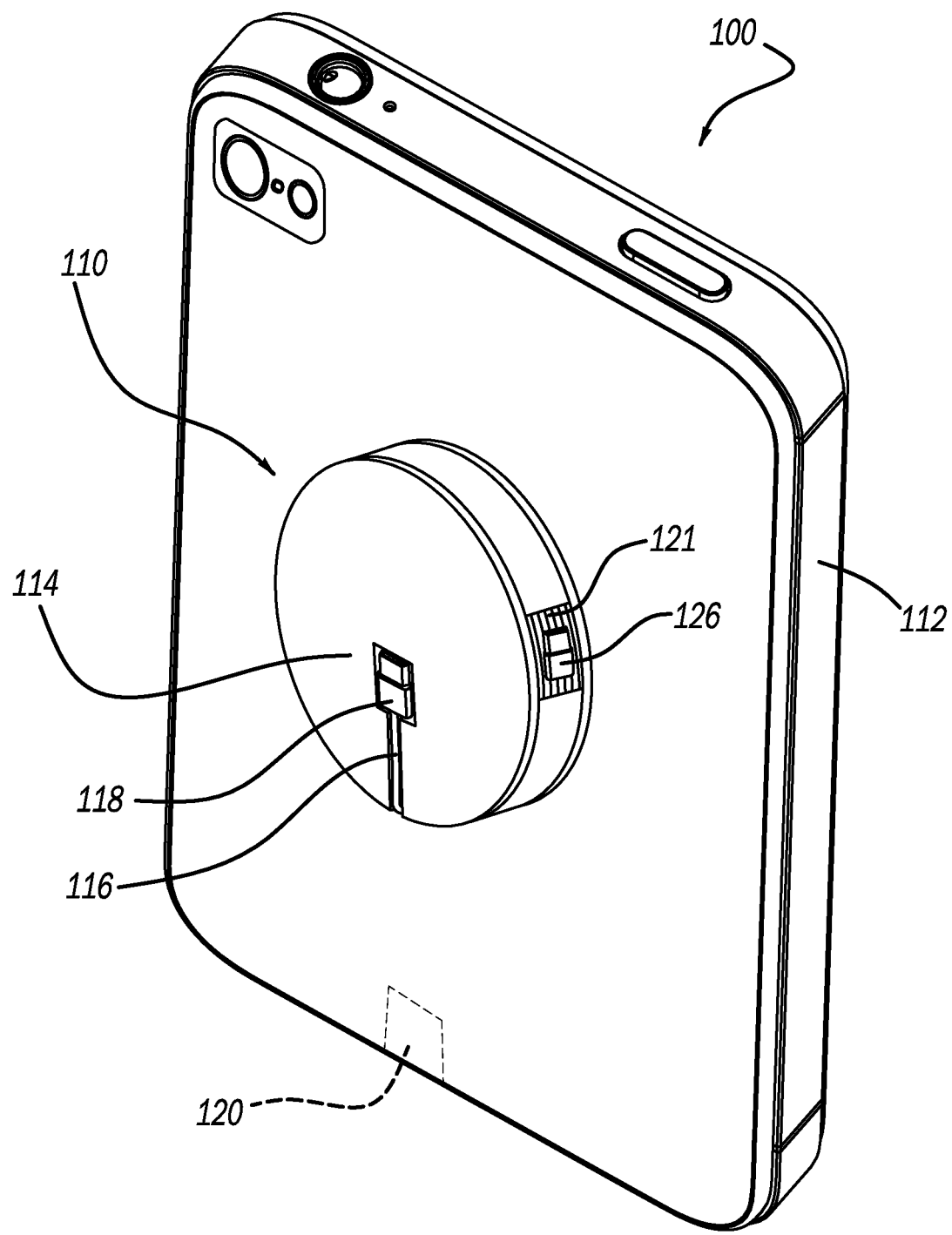
FIGS. 1A and 1B illustrate a system having a device for charging a portable electronic device.

Referring to FIG. 1A, a system 100 including a device 110 for charging a portable electronic device, such as a mobile phone 112 as shown. It should be understood, that while a mobile phone 112 is shown in the examples provided in the specification, it should be understood that the mobile phone 112 may be any type of electronic device, especially portable electronic devices. As such, instead of a mobile phone 112, the portable electronic device could be a tablet computer, notebook computer, speaker, music playback device, portable radio, and the like. Again, the portable electronic device could encompass any one of a number of different electronic devices that are powered by a battery.

The housing 114, as will be described in greater detail in the figures and paragraphs that follow, includes a cable 116 having a connector 118. The connector 118 may connect to a power source so as to provide power to the mobile phone 112 through either an inductive charging component or via the charging port 120 of the mobile phone 112. The connector 118 and portions of the cable 116 may be removably coupled to a cavity 123. The purpose of the cavity 123 is to allow neat storage of the connector 118 and/or the cable 116 so that the connector 118 and/or the cable 116 is generally flush with the overall surface of the device 110. The housing 114 may be mounted to the mobile device 112 any appropriate means for connecting one service to another. For example, the housing 114 may be mounted to the mobile device 12 through the use of an adhesive, magnets, air suction material, or other means for mounting the housing 114 to the mobile device 112.

Figure 1B:
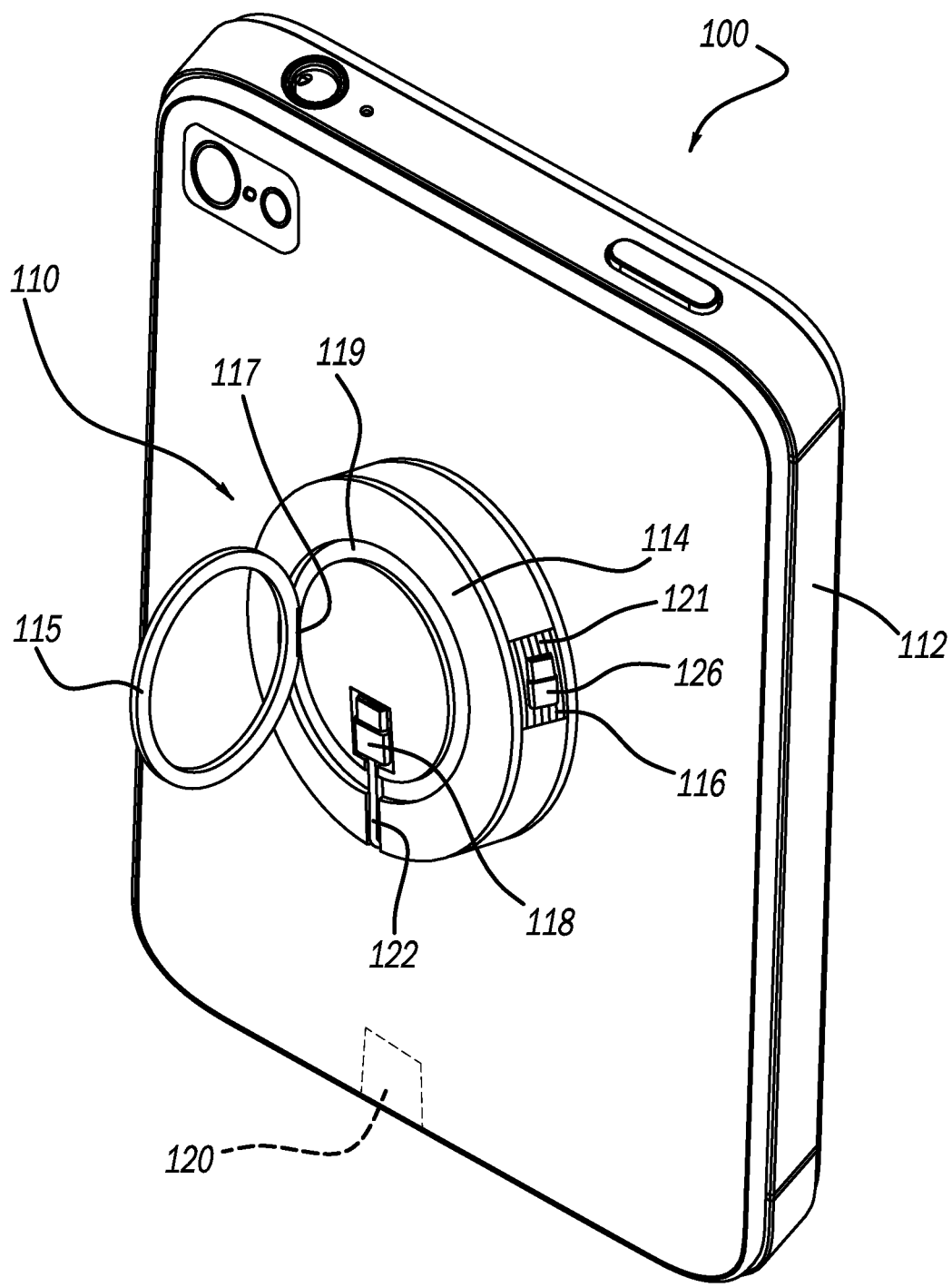

FIG. 1B illustrates a slightly different variation of the device 110 of FIG. 1A. Moreover, in this example, the device 110 of FIG. 1B includes a support member 115 in the shape of a ring. The support member 115 can take any one of a number of different shapes and does not necessarily need to take a circular shape is shown. Furthermore, the support member 115 is shown to be a ring that defines a cavity. As this is just an example, the support member 115 may be devoid of such a cavity.

The support member 115 generally rests within a channel 119 formed on a surface of the device 110. The channel 119 allows the support member 115 to rest within the channel 119 when not in use. The support member 115 is specifically attached to the device 110 via the use of a hinge 117. The hinge 117 allows the support member 115 to extend outward into an extended position, as shown in FIG. 1B. When extended as shown, the support member 115 can act as a support for supporting the mobile device 112 on a flat surface, such as a table. The hinge 117 that is connected to the support member 115 can rotate in a circular direction. This allows the support member 115 to not only swivel with respect to the hinge 117, but because the hinge 117 can rotate in a circular direction, the member 115 can essentially swivel with respect to anywhere along where the hinge 117 has rotated to.

The support member 115, because it is shaped as a ring having a cavity, can interact with one or more fingers of a user of the mobile device 112 so as to allow the mobile device 112 to be gripped better by the user. When not used by the user, the support member 115 can be neatly stored in a retracted position within the channel 119.

Figure 2A:
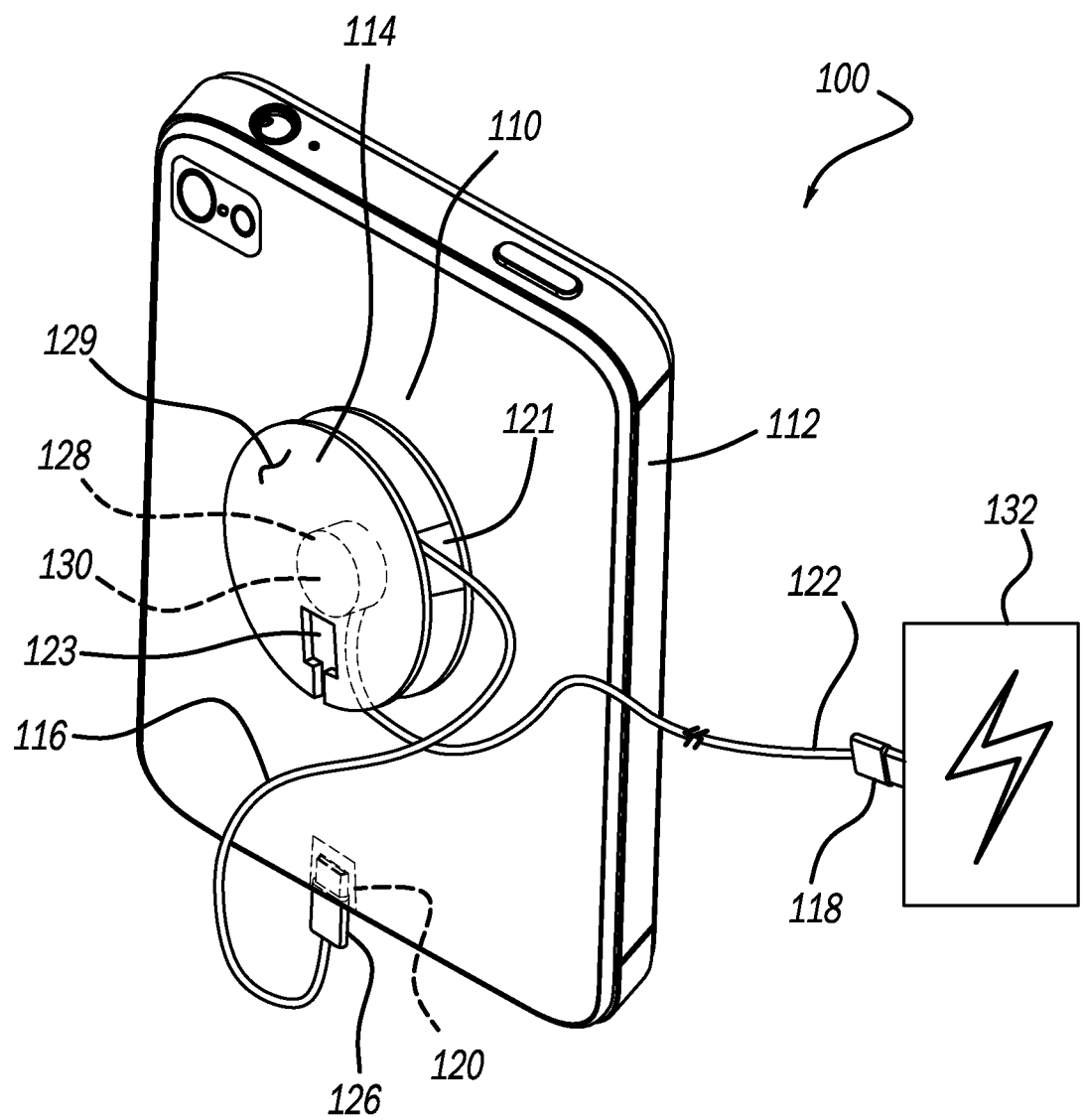
FIGS. 2A and 2B illustrate more detailed views of examples of the device for charging a portable electronic device.

Referring to FIG. 2A, a more detailed view of the components making up the device 110 are shown. In this example, the support member 115 of FIG. 1B is not shown, but it should be understood that it could be integrated in this example or any of the other examples shown and described in this specification.

In this example, as stated previously, the device 110 includes a housing 114. The housing 114 defines a cavity 129. The device 110 also includes a cable 116 that extends from the housing 114 via an opening 121.

The cable 116 may have a connector 126 that has configured to connect to the charging port 120 of the mobile phone 112. As such, the connector 126 may be any type of connector commonly found on a mobile phone or other portable electronic devices. This type of connector may include a USB Type-C connector, a USB mini connector, a micro USB connector, or a Lightning connector, commonly found on devices produced by Apple, Inc. of Cupertino, Calif. The cable 116 may be of such a length so as to adequately connect to the port 120 but short enough so as to be readily stored within the cavity 129 of the housing 114. The housing 114 may also have a cavity for allowing the connector 126 to be stored therein, similar to the cavity 123 which allows for the storage of the connector 118.

The device 110 also includes a second cable 122 which has a connector 118. The connector of the second cable 133 may be any type of connector. The first cable 116 and the second cable 122 are in electrical communication with each other. The cable 122 is generally greater in length as it is intended to connect to a power source 132 via the connector 118. As such, the second cable 122 may also wrap around a post 128 or may also include a retraction device 130 so as to allow the retraction of the second cable 122 so as to be stored neatly within the housing 114 of the device 110.

Because the first cable 116 and the second cable 122 are in electrical communication with each other, when connected as shown in FIG. 2A, the device 110 can transmit power from the power source 132 via the connector 118 through the cable 122 and eventually to the charging port 120 via the connector 126 of the first cable 116. After completing charging, the operator can then retract the second cable 122 neatly within the housing 114 of the device 110 for later storage. Also, the connector 118 and portions of the second cable 122 may be placed back within the cavity 123 so as to neatly store these components.

The housing 114 may also include an energy storage device, such as a battery or capacitor. The battery or capacitor may be in electrical communication with the cables 116 and 122. If the housing 114 utilizes an energy storage device, the energy storage device utilize the cables 116 and/or 122 to charge the energy storage device, but also connect the mobile device 112 to the energy storage device, so as to provide power to the mobile device 112. Additionally, the energy storage device located within the housing 114 could be charged by another methodology such as radiofrequency, solar energy, vibrations, static electricity, and the like. The energy storage device can store amounts of energy over a period of time for later discharge emergency situations.

By so doing, a device 114 has the advantages over prior art solutions which do not include the cable or, if they do include a cable, require all or some of the cable to be stored outside of the housing 114 making the appearance of the mobile phone 112 looking rather clumsy and unattractive.

Figure 2B:
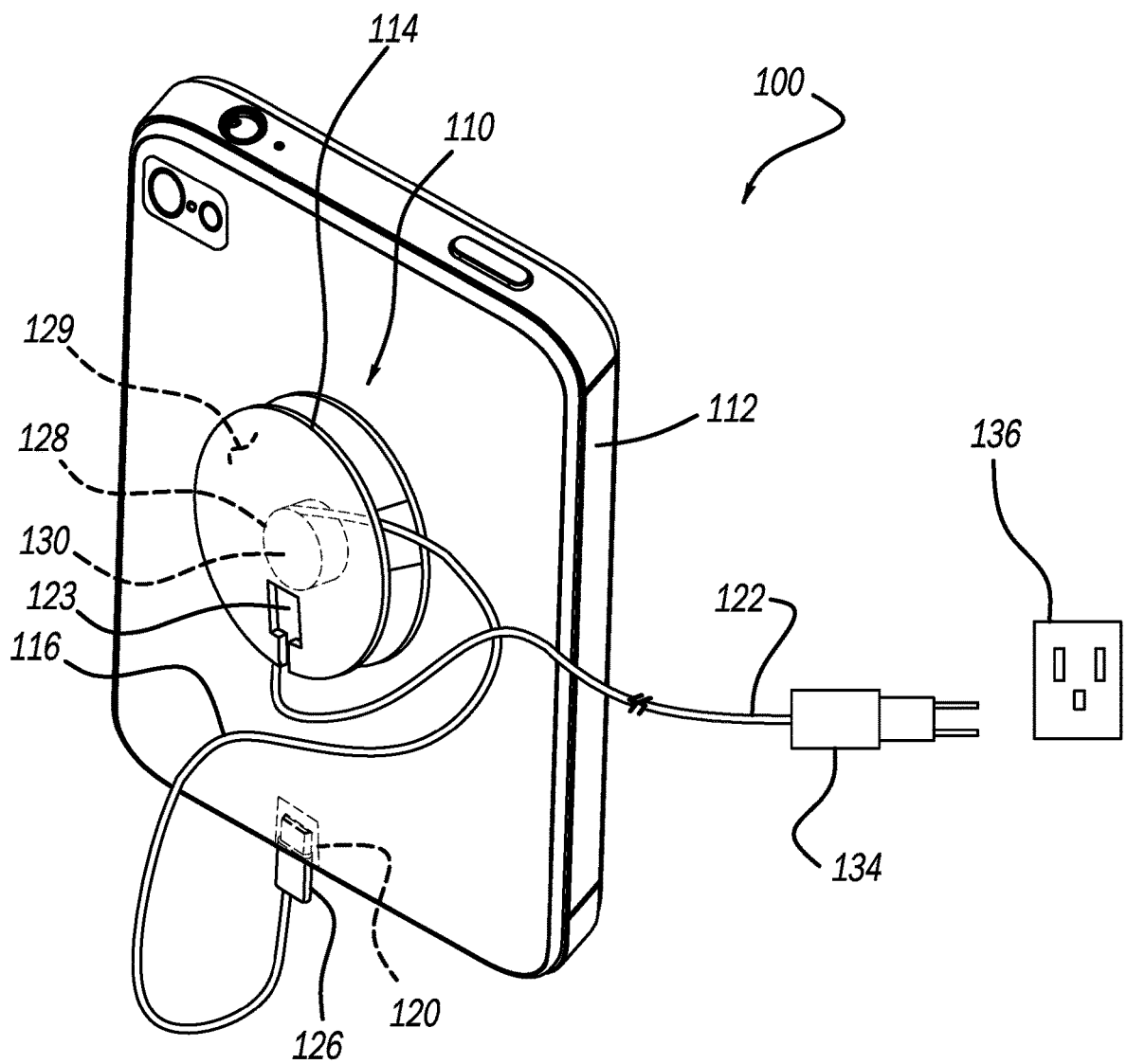

Referring to FIG. 2B, another example of the device 110 is shown. Here, like reference numerals have been utilized to refer to like elements and, as such, the previous description provided also applies. The example in FIG. 2B differs from that of FIG. 2A in that the cable 122 terminates with a plug 134 as opposed to a connector 118. The plug 134 is such that is configured to connect to a socket 136. The plug 134 and the socket 136 may be any kind of common electrical socket found. As it is well known, different countries and different regions utilize different types of electrical plugs and electrical sockets, and it should be understood that the description contemplates the use of any and all different types of plug and socket devices current known.

Figure 3A:
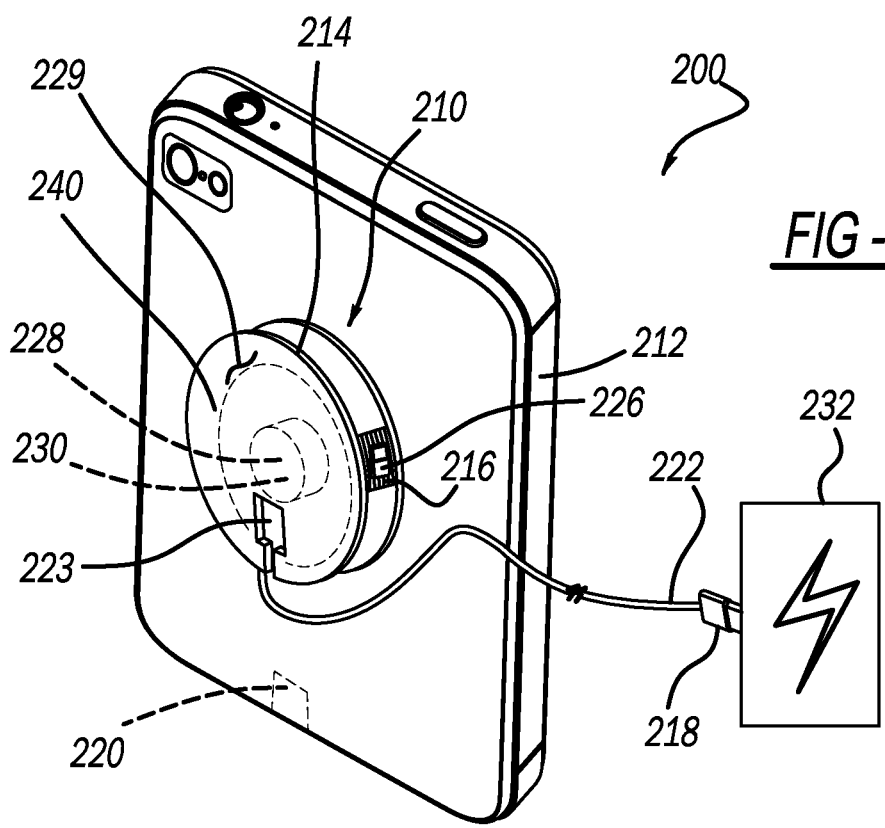
FIGS. 3A and 3B illustrate more detailed views of examples of the device having an inductive charging component.

Referring to FIG. 3A, another example of the device 210 is shown. It should be understood that like reference numerals have been generally utilized to refer to like elements described previously in the specification, with the exception that these elements have been incremented by 100. Here, like before, the device 210 includes a cable 222 that terminates with a connector 218. This connector 218 is connected to a power source 232 for providing power to the cable 222. However, in this example, the device 210 differs from that of the devices previously described in that the device includes an inductive charging component 240 formed within the housing 214.

As such, when the connector 218 is connected to a power source 232 electricity is provided to the cable 222 and eventually to the inductive charging component 240. Assuming that the device 212 has an inductive charging feature, the inductive charging component 240 is able to charge the battery of the mobile device 212 using an inductive charging methodology. One type of inductive charging standard is the Qi standard. The Qi standard is an open interface standard that defines wireless power transfer using inductive charging over certain distances. As such, the device 210 may be such that it utilizes the Qi standard.

Figure 3B:
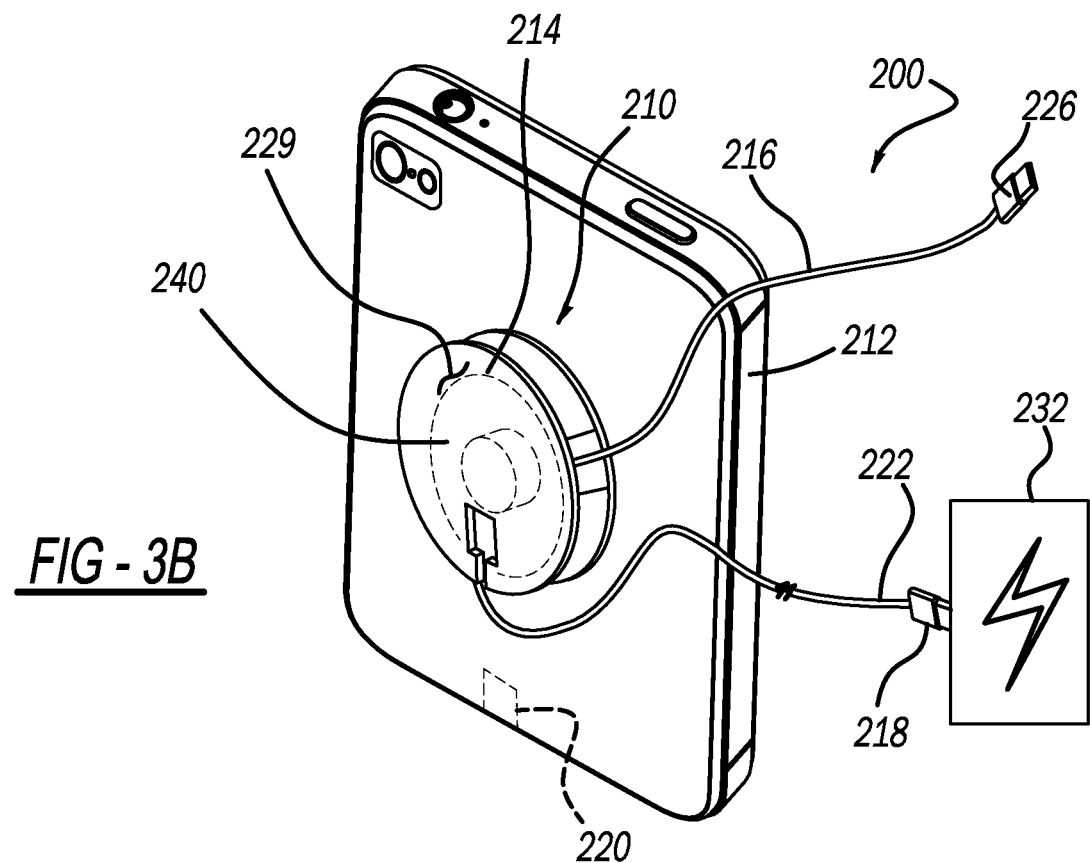

Referring to FIG. 3B another example of the device 210 is shown. Here, the device 210 of FIG. 3B is similar to the device 210 of FIG. 3A, with the exception that the device shown in FIG. 3B also includes a cable 216, similar to that shown in FIGS. 2A and 2B. Here, like before, the cable 216 terminates with the connector 226 that may connect to the charging port 220 of the mobile device. Alternatively, the connector 226 could connect to the charging port of a completely different portable electronic device. As such, in this example, the mobile device 212 may be charged using the inductive charging component 240 and/or the connector 226. Therefore, this example provides the flexibility of charging the mobile device 212 using either the inductive charging component 240 or directly via the connector 226.

Additionally, with regards to both FIGS. 3A and 3B, it should be understood that while the examples shown in these figures showed the connector 218 connected to a power source 232, it should be understood that the connector 218 may be replaced with a plug and a socket, such as plug 134 and socket 136 shown and described in FIG. 2B.

Figure 4A:
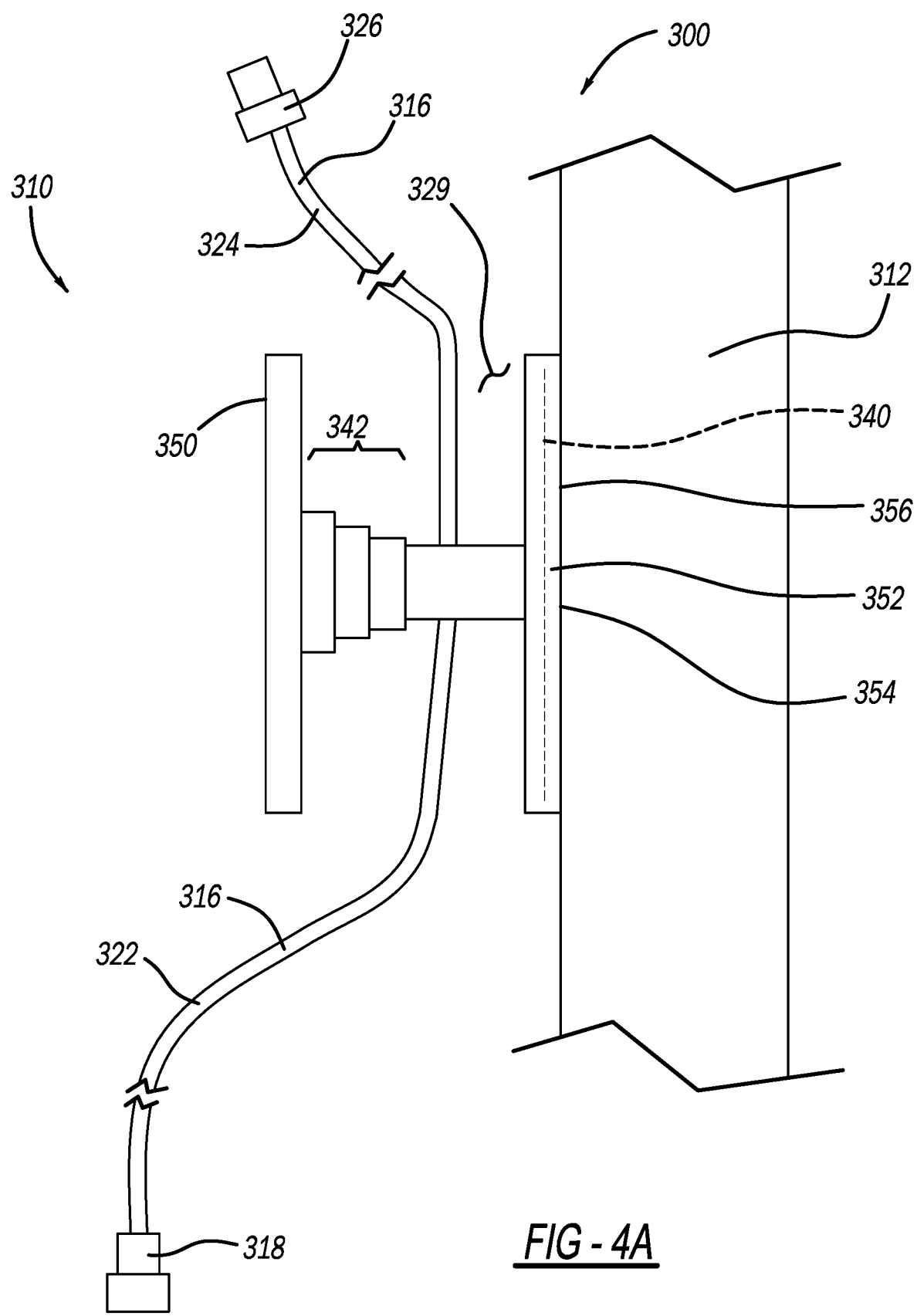
FIGS. 4A, 4B, and 4C illustrate a side view of the device for charging a portable electronic device, the device in these figures being collapsible.
Figure 4B:
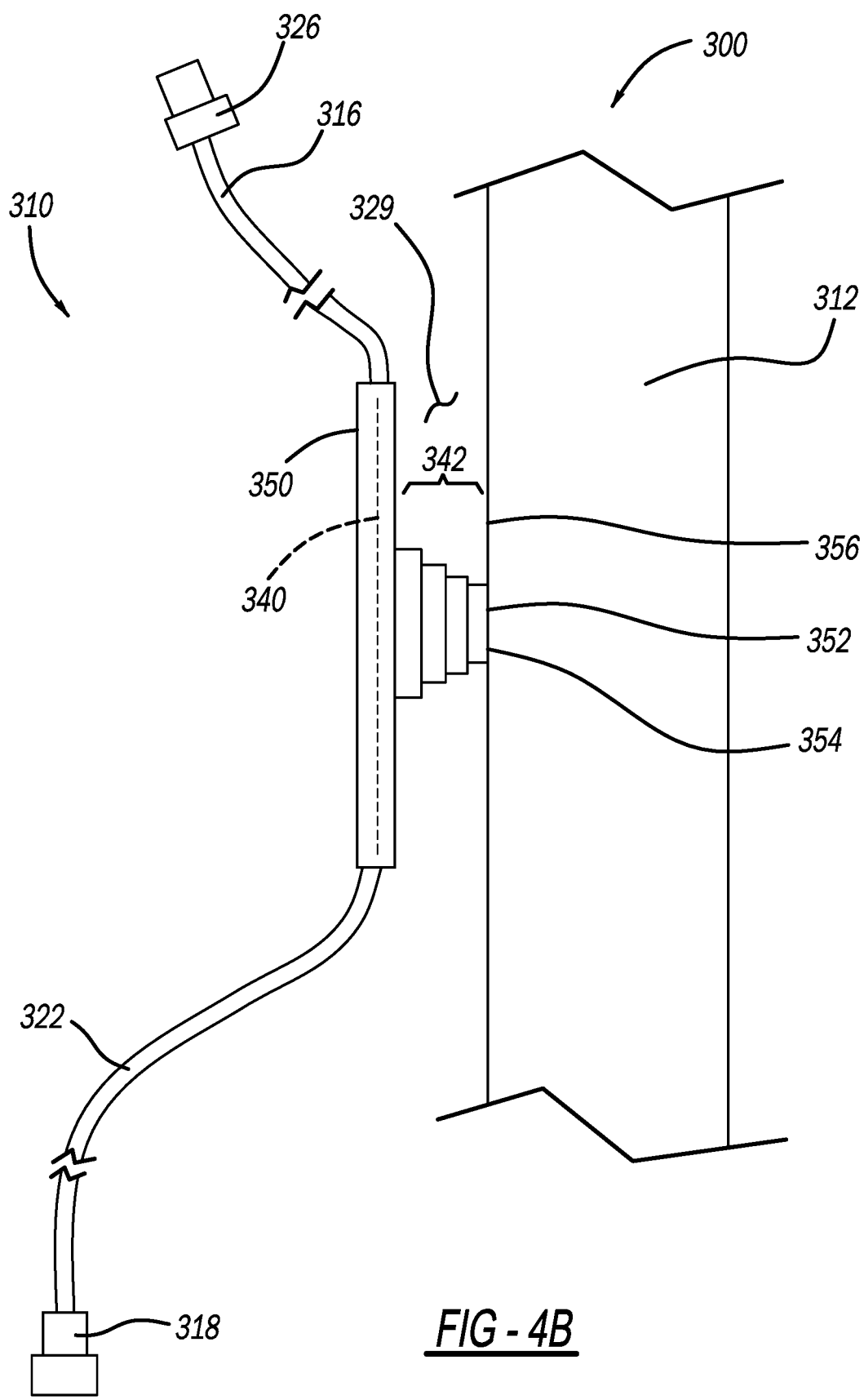
Figure 4C:
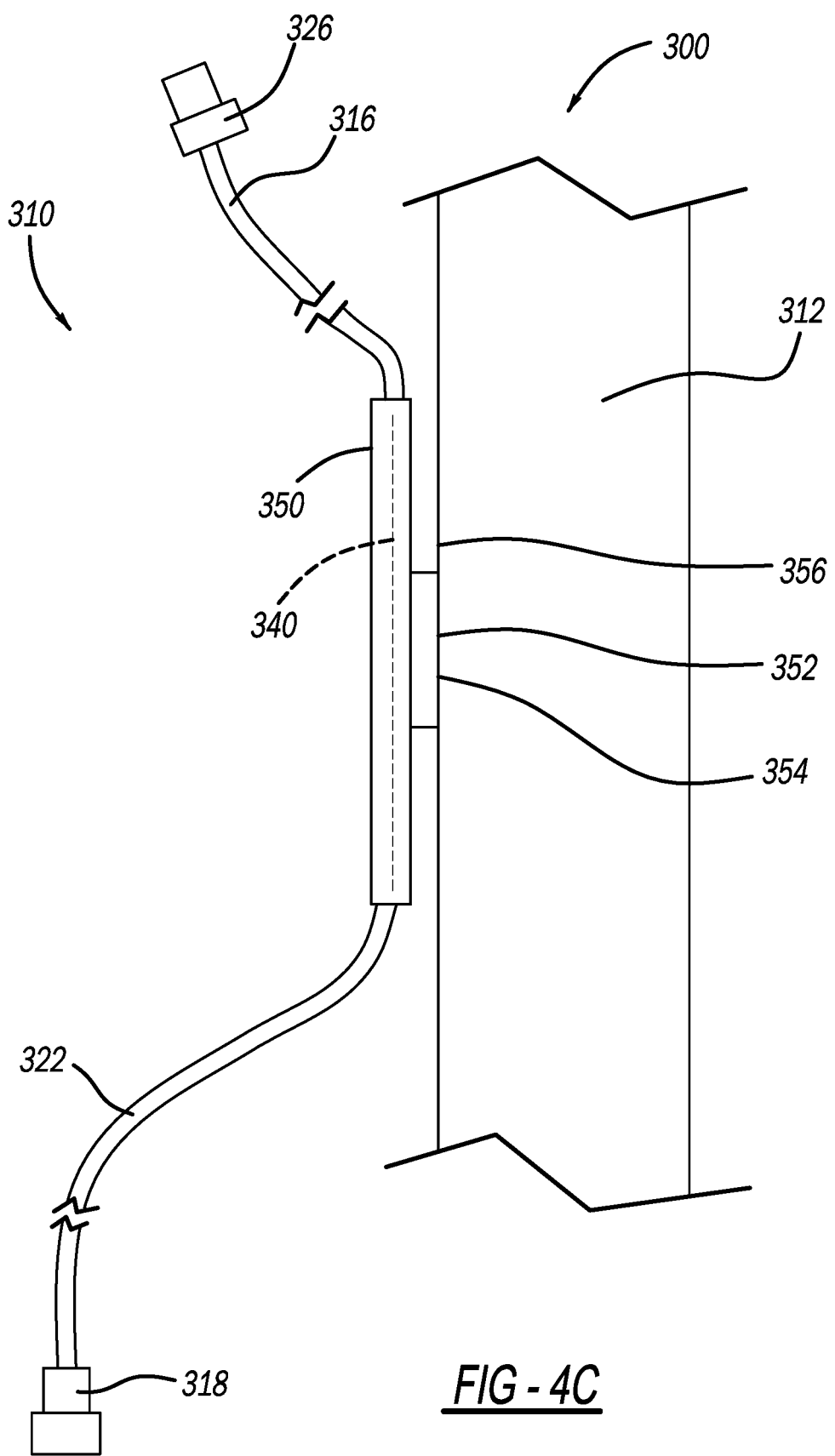

Referring to FIGS. 4A, 4B and 4C, a side view of the device 310 is shown with different optional implementations. It should be understood that like reference numerals have been used to refer to like numerals with the exception that the reference numerals have been incremented by 100 or 200. It should also be understood that the example shown in FIG. 4 may include elements that could be readily incorporated in any of the other examples discussed in this specification.

Here, the phone 312 is shown connected to the device 310. The device 310 has a surface 354 that is flush with a surface 356 of the phone 312. An adhesive 352 may be utilized so as to fixedly attach the device 310 to the phone 312. The adhesive 352 could be a magnet or any other type of means for joining two separate items together.

FIG. 4A illustrates the device 310 where an independent cord may be used in conjunction with the device 310, rather than using an integrated retractable cord the cord may be wrapped around portions of and, for example, stored within the space 329 of housing.

FIG. 4B illustrates the device 310 with a retractable cable. The device 310 may also include a second surface 350 that defines a space 329 between the surfaces 354 and 350. The surface 350 may be connected to one or more collapsing components 342 that essentially allow the extension or retraction of the surface 350 in relation to the phone 312. So, for example, as shown in FIG. 4, the surface 350 is in an extended position. The ability to allow the surface 350 to extend or retract has the advantage of providing additional space 329 for storing the cable 316 but also allows for one to utilize the device 310 as a stand for holding up the phone 312 when the surface 350 is fully retracted from the phone 312. Essentially, the operator of the phone 312 can extend the surface 350 and prop up the phone 312 on a support surface so as to be able to view the screen of the phone 312 without holding on to the phone 312 with one or more hands.

FIG. 4C illustrates the device 310 from 4B after being collapsed. 4A and 4B are showing a retractable cable that is part of the device.

Also, it should be understood that the different elements shown in the previously described embodiments may be equally incorporated within the device 310 shown in FIGS. 4A, 4B, and 4C. Additionally, if the device 310 does not include the inductive charging component 340, this component would be removed from this example. Again, it should be understood that each of the elements shown and described in the figures can be removed or added to the other examples provided.

Figure 5A:
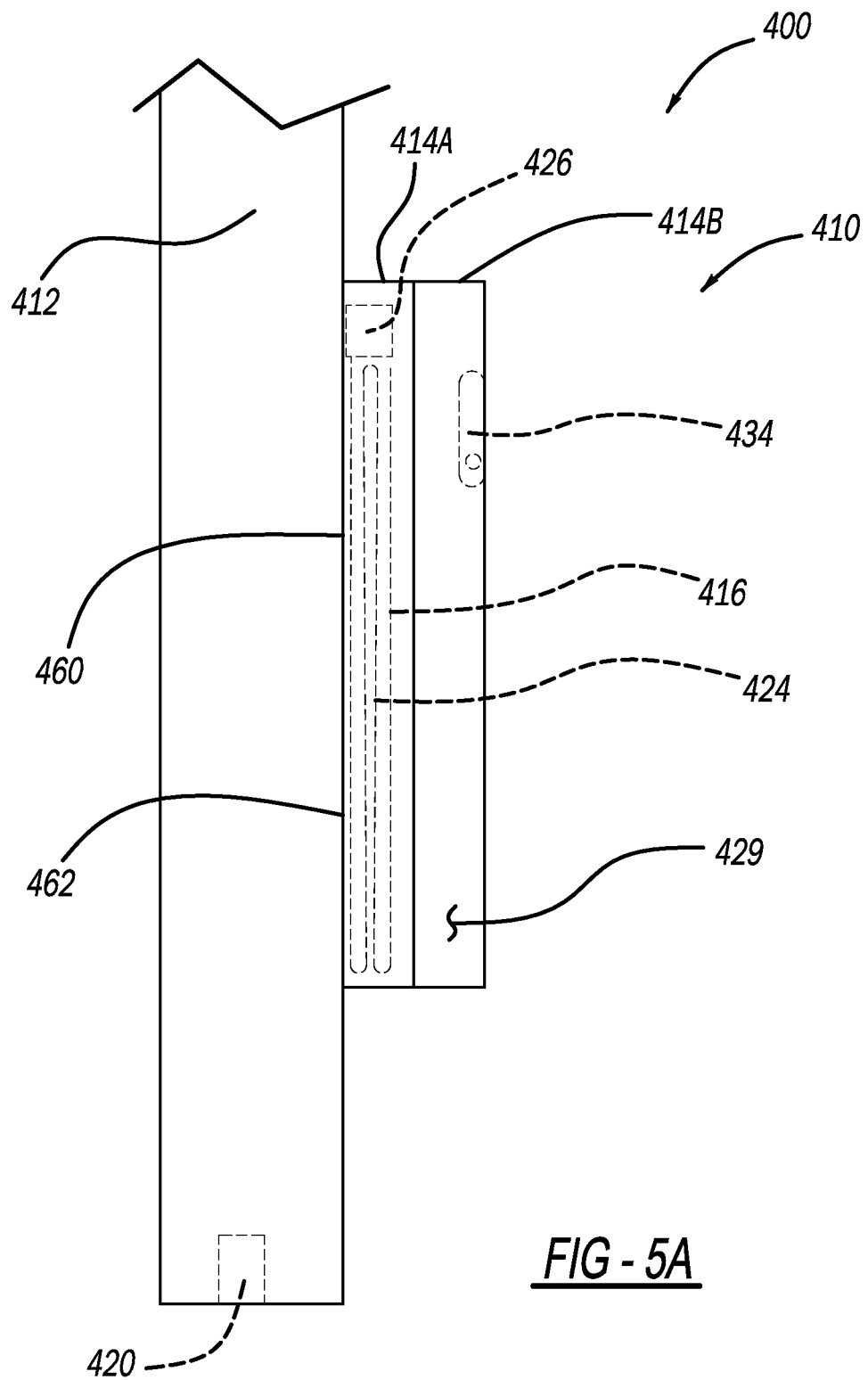
FIGS. 5A, 5B, 6A, 6B, 6C, and 6D illustrate other examples of the device for charging a portable electronic device, the device in these figures have two separable parts.
Figure 5B:
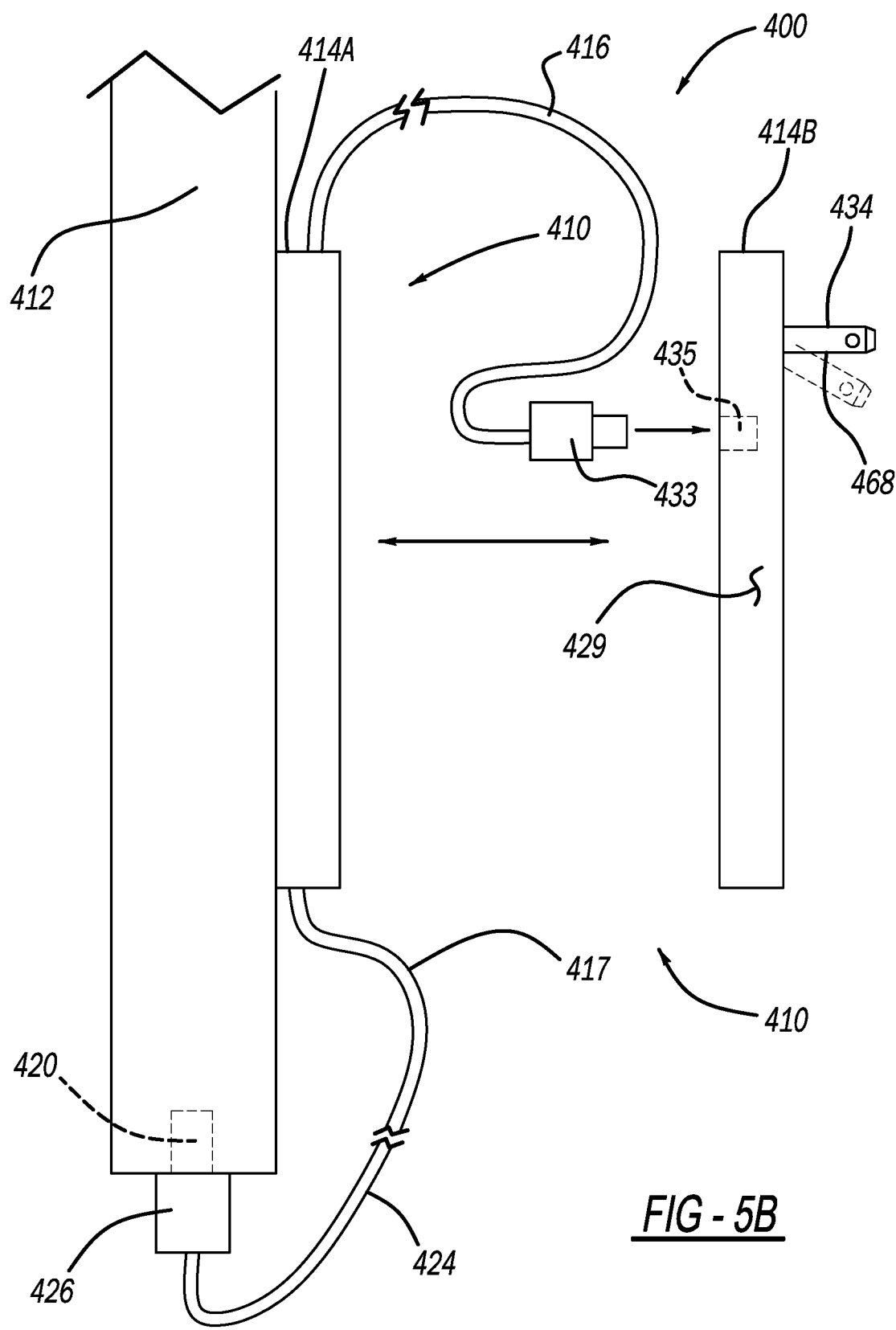

Referring to FIGS. 5A and 5B, another example of the device 410 is shown. Like before, like reference numerals have been utilized to refer to like components with the exception that they have been incremented by 100. Here, the device 410 includes a first part 414A and a second part 414B. The first part 414A has a surface 460 that is attached to the mobile device 412 using an adhesive 462. The first part 414A and the second part 414B are selectively separable from one another. That is, they can be connected to each other at sometimes but separated from each other at other times. The second part 414B may attach to the outer surface of the first part 414A. The first part 414A may store the cable for connection to the second part 414B. In some situations an electrical contact could be created between the first part 414A and the second part 414B allowing both parts to securely connect and transfer electric power.

The methodology for connecting the first part 414A to the second part 414B can include any one of a number of different known methodologies. For example, the first part 414A and second part 414B may be connected to each other through one or more clips that allow the second part 414B to be removable from the first part 414A or magnets that allow the first part 414A and second part 414B the be magnetically coupled to each other. The cavity may be formed within the first part 414A. The cavity 429 functions to store a cable 416 when the second part 414B is connected to the first part 414A.

The cable 417 has a first part 424 that includes a connector 426 that is configured to connect to a charging port 420 of the mobile device 412. Opposite of the connector 426 on the cable 416 is a connector 433 that can be connected to a port 435 of the second part 414B. The port 435 is in electrical communication a power unit (e.g. a capacitor, power supply, battery, etc.) which may be powered with the prongs 434. As such, when the prongs 434 are inserted into a wall socket, electricity is transferred from the wall socket, through the prongs 434 and to the cable 416 via the port 435. This in turn provides power to the cable 417 and eventually to the port 420 of the portable electronic device 412.

The prongs 434 our configured to connect to a wall socket and therefore provides electricity to the cable 416 and eventually to the mobile device 412. The prongs 434 may be foldable in such a way that they can fold into the housing that defines the second part 414B of the device 410. Of course, it should be understood that instead of using prongs 434, a connector, such as a USB connector or other type of connector may be utilized and connected to a power source so as to provide power to the cable 416 and eventually to the mobile device 412. For example, connector 433 may be directly connected to an electricity source.

As such, in the examples shown in FIGS. 5A and 5B, the first part 414A may define a cavity or storage space 429 so as to store the cable 416. This is advantageous because it allows for the cable to be neatly stored when not in use.

Referring to FIGS. 6A, 6B, 6C, and 6D, another example of the device 410 is shown. Here, the device 410 of FIGS. 6A, 6B, 6C, and 6D is similar to the device 410 of FIGS. 5A and 5B, however, in this example, the device 410 of 6A, 6B, 6C, and 6D has the cable 422 extending between the second part 414B of the device 410 to the first part 414A of the device 410. The second part 414B may sit flush within a cavity formed within the first part 414A. In situations when the second part 414B sits flush within the cavity form within the first part 414A, an electrical contact could be created allowing both parts to securely connect and transfer electric power. The cavity 429 may be formed entirely within the first part 414A or may be formed within both parts 414A and/or 414B. The cavity 429 functions to store the cable 416. Various portions of the housing may include features to store and retain the connectors on either end of the cable.

From there, power is provided to the mobile device 412 via the first part 424 of the cable 416 which is connected to the port 420 via a connector 426. While connector 426 is illustrated on the side of the second part 414B, connector 426 may be positioned into the top surface of second part 414B when not in use and for example may positioned between the prongs 434 similar to connector 418.

Additionally or alternatively, power may be provided to the mobile device 412 via the inductive charging element 440. As such, the device shown in this figure may either have one or both of the first part 424 of the cable 416 and/or inductive charging element 440 so as to provide power to the mobile device 412.

Figure 6A:
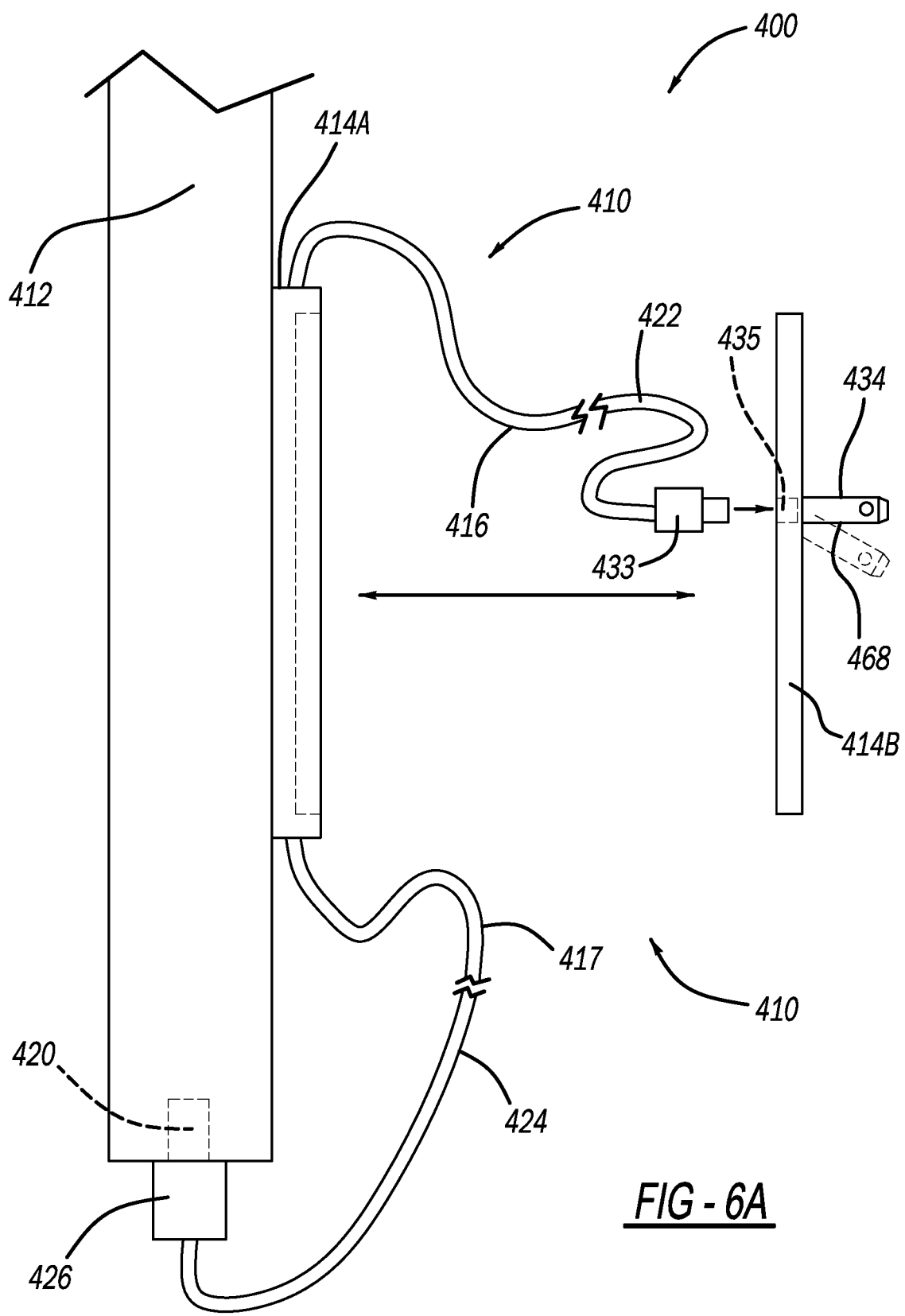
Figure 6B:
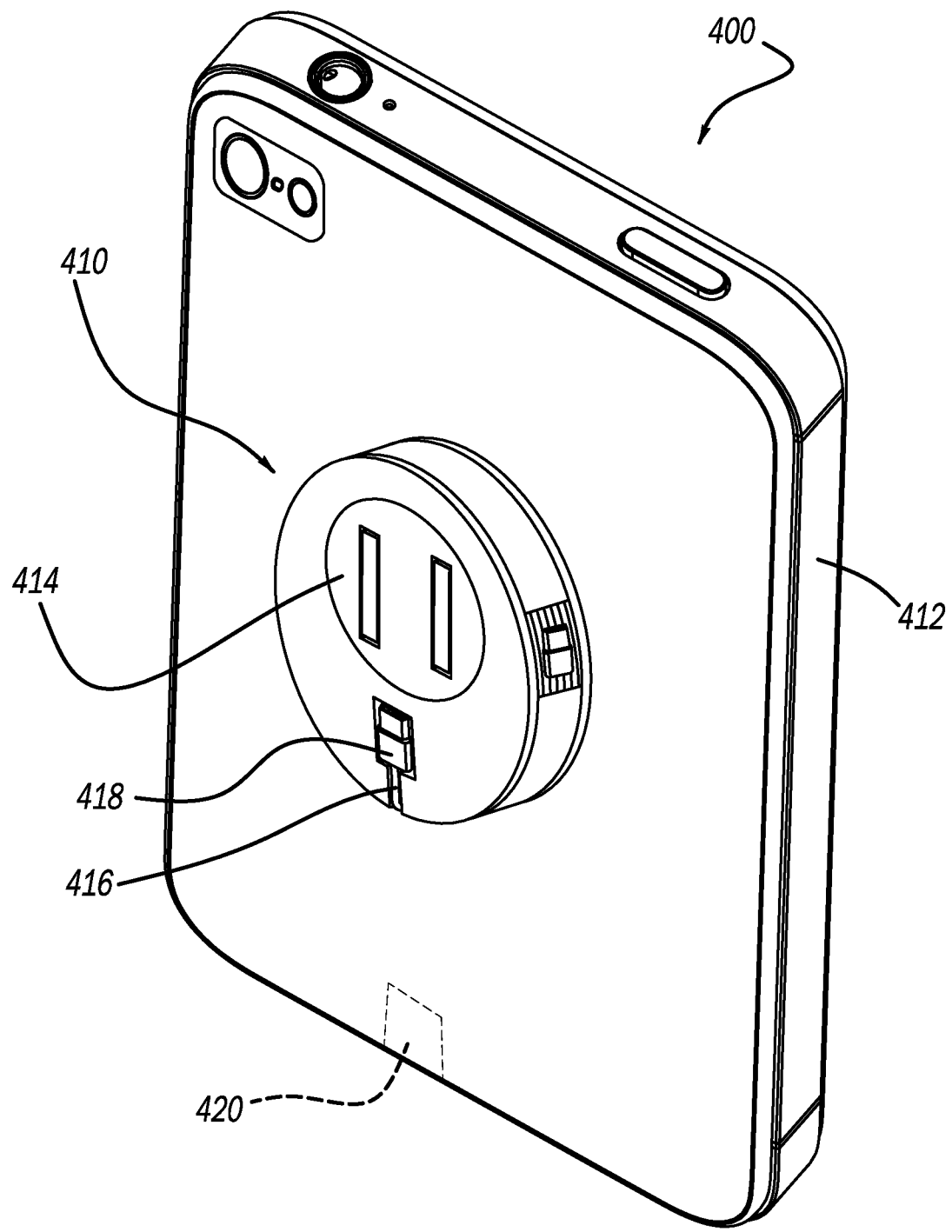
Figure 6C:
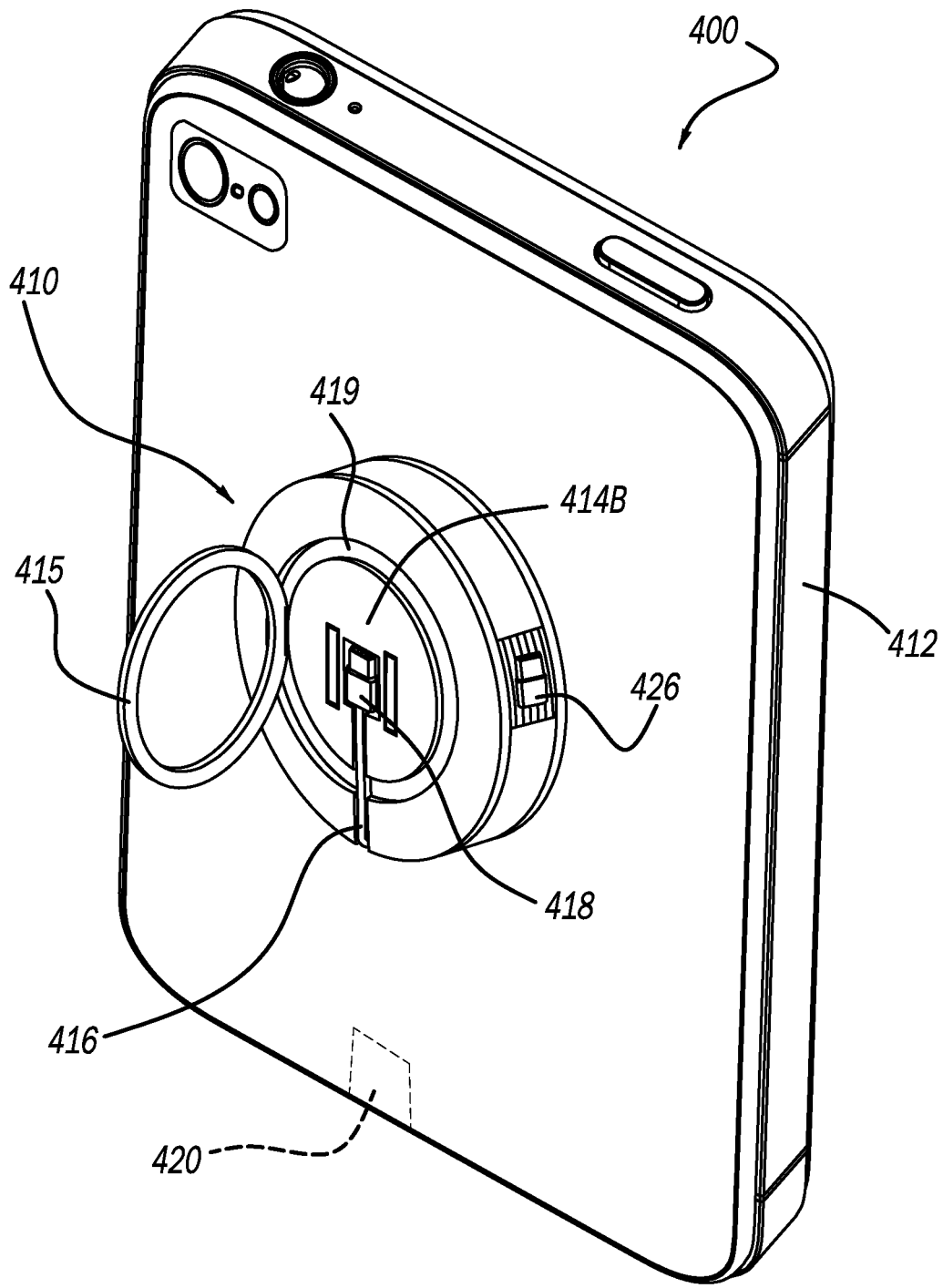

As to FIG. 6C, this figure is similar to the other examples provided, but further includes a support ring 415 that is rotatably attached the device 410 and can be stored within a channel 419, as mentioned in previous examples.

Figure 6D:
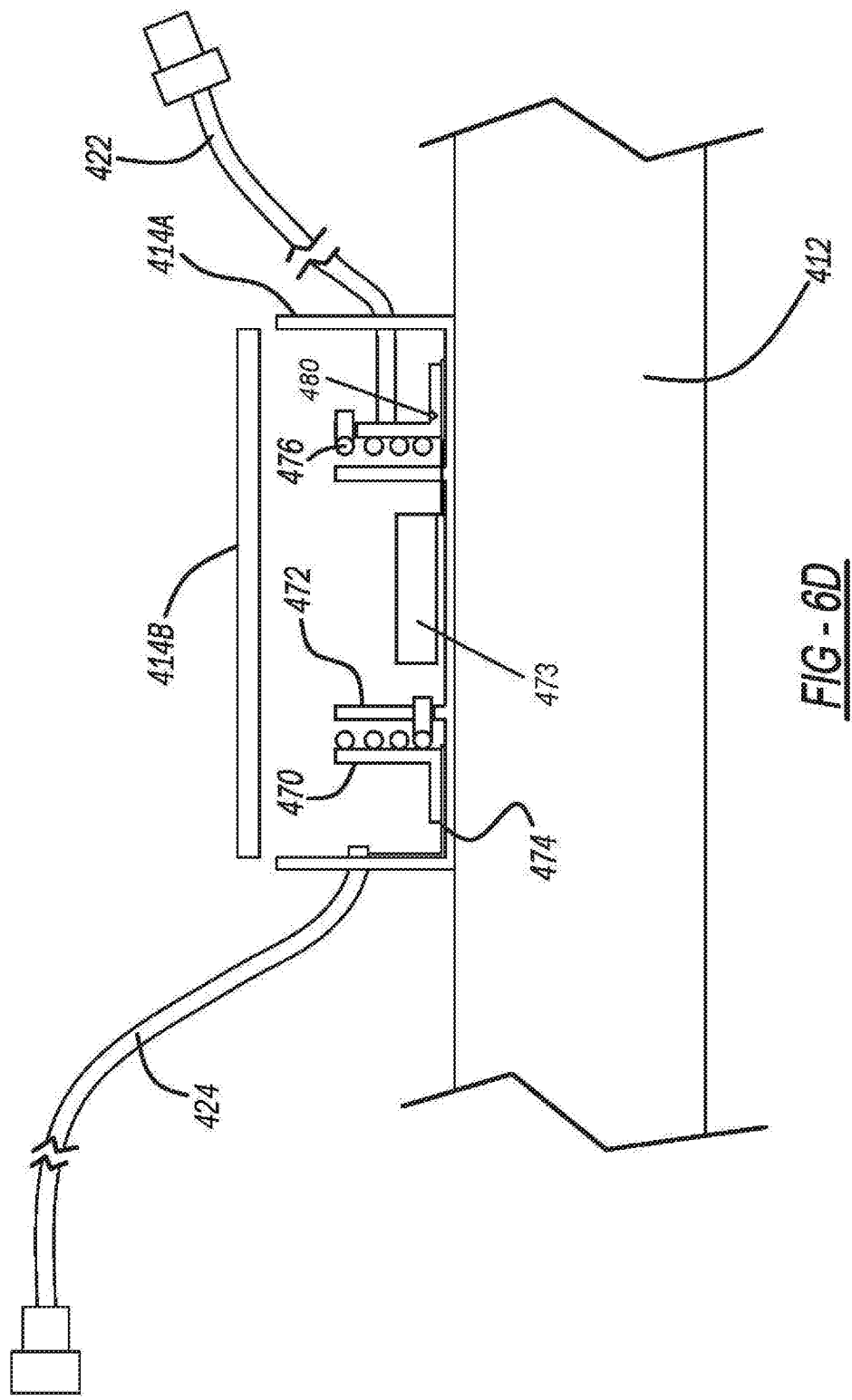

FIG. 6D is a sectional side view of one implementation of the device 410 with a retractable cord. The first part 414A and/or the second part 414B may include a hub 472. The hub 472 may be used to store a battery, or other power storage or power transfer device 473 such as one of the inductive charging components. In some implementations, the second part 414B may include the battery or other power device and may sit inside the hub 472 of the first part 414A. A disk 470 may be seated around the hub 472 and may be configure to rotate (e.g. concentrically) around the hub 472. A spring 476 may be connected between the hub 772 and the disk 470. Accordingly, the diameter inside the hub 472 may be 0.5-1.5 inches which is available for storage. This design is particularly unique since a coil spring is not connected to a center pole of the device, but instead is attached to the outside wall of the hub allowing for extra storage space. However, it is understood that other features described in this application may be used in conjunction with a spring that is connected to a center pole. The cable 422 may be connected to the disk 470. As such, the spring 476 will act to retract the cable 422 by rotating the disk 470 when released. The disk 470 may include a groove 480 such that the cable 422 tracks the groove 480 and may be constrained by the groove 480 as it is retracted. The cable 422 may be electrically connected to traces on the disk 470. The traces on the disk 470 may be electrically connected to traces on the first part 414A, for example through brush contacts 474 on either the first part 414A or the disk 470. The traces on the first part 414A may be connected to the cable 424. The cable 424 may be fixed to the first part 414A.

Any of the cables discussed herein may take different forms. For example, different materials, gauges, and shapes (round or flat) may be used. For example, in certain implementation relevant to each Figure discussed, the cables may be flat cables to reduce space required to store the cable.

As a person skilled in the art will readily appreciate, the above description is meant as an illustration of an implementation of the principles this invention. This description is not intended to limit the scope or application of this invention in that the invention is susceptible to modification, variation, and change, without departing from the spirit of this invention, as defined in the following claims.

The invention claimed is:

1. A device for charging a portable electronic device, the device comprising:
   a housing having a first surface configured to adhere to the portable electronic device, and a second surface opposite the first surface, the second surface defining a channel having opposing side surfaces extending from the second surface towards the first surface;
   a first cable having a first end configured to connect to a power source;
   wherein a battery of the portable electronic device is capable of being charged when the first end of the first cable is connected to the power source;
   wherein the housing defines a cavity configured to store the first cable within the cavity when the first cable is not connected to the power source;
   a retractor located within the housing, the retractor connected to the first cable and being configured to allow an extension or retraction of the first cable from the housing; and
   a ring pivotally attached to the housing by a hinge and operable between a retracted position and an extended position, the ring and hinge structured to support the portable electronic device in the extended position, wherein the hinge is rotatably attached to the housing such that the ring and hinge can move in a circular path inside the channel along a circumferential direction.

2. The device of claim 1, wherein the housing is a collapsible housing configured to extend from the portable electronic device to an extended position and configured to retract from the portable electronic device to a retracted position.

3. The device of claim 1, wherein the first end of the first cable is one of a USB Type-A connector, USB Type-C connector, or an electrical plug.

4. The device of claim 1, further comprising a power unit configured to sit flush within the cavity, the power unit having prongs configured to interconnect with a wall socket and provide power to the portable device.

5. The device of claim 1, wherein the cavity includes a recess on a surface of the housing, and further comprising a connector of the first cable that is housed flush in the recess on the surface of the housing.

6. The device of claim 1, wherein the circular path of the housing defines the channel receiving the ring when the ring is in the retracted position, and wherein the first end of the first cable includes a connector, and the housing defines a recess selectively receiving the connector, and wherein the channel intersects a portion of the recess such that the ring blocks the intersection of the channel and recess when the ring is in the retracted position.

7. The device of claim 1, wherein the retractor and the circular path of the ring share a common axis of rotation.

8. The device of claim 1, further comprising an inductive charging component disposed within the housing and in electrical communication with the first cable, wherein the housing aligns the inductive charging component relative to the portable electronic device such that the portable electronic device is wirelessly charged when the second end of the first cable is connected to the power source and provides power to the inductive charging component.

9. The device of claim 8, wherein the housing includes a first part and a second part, the first part attached to the portable electronic device, the first part including a hub and a disk seated around the hub and configured to rotate concentrically about the hub to define the retractor configured to retract at least a portion of the first cable through rotation of the disk, the inductive charging component being located in the hub.

10. The device of claim 1, wherein the housing has a center shaft, a top surface and a bottom surface, wherein the first cable is configured to wrap around the center shaft.

11. The device of claim 10, wherein the housing is a telescoping collapsible housing configured to extend from the portable electronic device to an extended position and configured to retract from the portable electronic device to a retracted position.

12. The device of claim 10, wherein the top surface or the bottom surface is substantially circular in shape.

13. A device for charging a portable electronic device, the device comprising:
   a housing having a first part with a first surface configured to adhere to the portable electronic device, the housing having a second part spaced away from the first part to define a cavity therebetween, the second part connected to and moveable relative to the first part, the second part of the housing containing an inductive charging component;
   a cable having a first portion with a first end electrically connected to the inductive charging component and a second portion with a second end;
   wherein the housing positions the inductive charging component relative to the portable electronic device such that a battery of the portable electronic device is wirelessly charged via the inductive charging component when the second end of the cable is connected to a power source; and wherein the cavity is configured to store the cable within the cavity when the cable is not connected to the power source.

14. The device of claim 13, further comprising a retractor located within the housing, the retractor connected to the cable and being configured to allow an extension or retraction of the second portion of the cable from the housing.

15. The device of claim 13, wherein the housing is a collapsible housing configured to extend from the portable electronic device to an extended position and configured to retract from the portable electronic device to a retracted position.

16. The device of claim 13, wherein the second end of the cable is one of a USB Type-A connector or an electrical plug.

17. The device of claim 13, wherein the housing has a center shaft, a top surface and a bottom surface, wherein the cable is configured to wrap around the center shaft.

18. The device of claim 17, wherein the housing is a collapsible housing configured to extend from the portable electronic device to an extended position and configured to retract from the portable electronic device to a retracted position.

19. The device of claim 17, wherein the top surface or the bottom surface is substantially circular in shape.

20. The device of claim 13, wherein the cavity is configured to house at least one of a battery or power unit with wall socket prongs.

21. The device of claim 13, wherein the housing defines a channel, and further comprising a ring pivotally attached to the housing by a hinge and operable between a retracted position and an extended position, the channel receiving the ring when the ring is in the retracted position, and wherein the first end of the first cable includes a connector, and the housing defines a recess selectively receiving the connector, and wherein the channel intersects a portion of the recess such that the ring blocks the intersection of the channel and recess when the ring is in the retracted position.

22. A device for charging a portable electronic device, the device comprising:
   a housing having a first part and a second part movably attached to the first part, the first part having a first surface configured to adhere to the portable electronic device;
   a cable having a first portion with a first end connected to the first part and a second portion with a second end;
   an inductive charging component separate from the cable and disposed within the first part of the housing and in electrical communication with the first end of the cable;
   wherein the second end is configured to connect to a power source;
   wherein the housing and inductive charging component are sized and positioned such that a battery of the portable electronic device is wirelessly charged when the second end of the cable is connected to the power source; and
   wherein the housing defines a cavity configured to store the cable within the cavity between the first part and second part, the first part including a hub and a disk seated around the hub and configured to rotate concentrically about the hub to define a retractor configured to retract at least a portion of the cable through rotation of the disk;
   wherein the hub incorporates the inducting charging component therein.

23. The device of claim 22, wherein the second part of the housing is configured to rotate relative to the first part of the housing.

24. The device of claim 22, wherein the first end of the cable is one of a USB Type-C connector, a USB mini B connector, a micro USB B connector, or a Lightning connector.

25. The device of claim 22, wherein the first end or second end of the cable is one of a USB Type-A connector or an electrical plug or a USB Type-C connector.

26. The device of claim 22, further comprising a ring being pivotally attached to the second part of the housing about a hinge, and extendable from the housing to support the portable electronic device, the hinge being rotatable in a circle relative to the first part of the housing such that the ring can both pivot and rotate relative to the portable electronic device.

27. The device of claim 22, wherein the housing defines a channel, and further comprising a ring pivotally attached to the housing by a hinge and operable between a retracted position and an extended position, the channel receiving the ring when the ring is in the retracted position, and wherein the first end of the cable includes a connector, and the housing defines a recess selectively receiving the connector, and wherein the channel intersects a portion of the recess such that the ring blocks the intersection of the channel and recess when the ring is in the retracted position.

* * * * *